May 26, 1959    B. WALKER    2,887,944
BARBECUE ROTISSERIE
Filed May 3, 1955
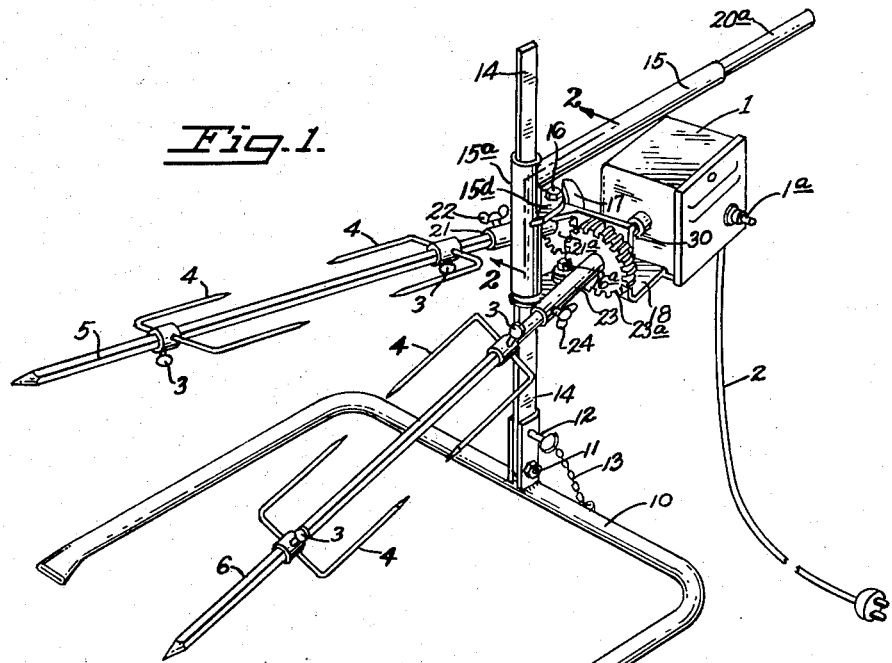
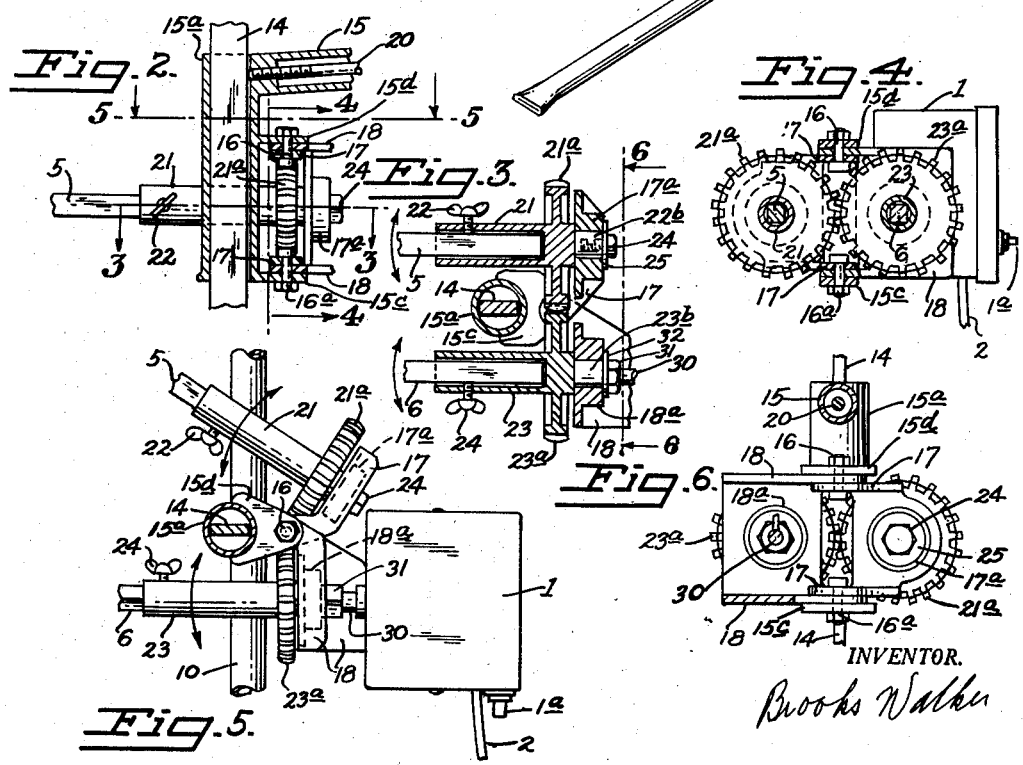
INVENTOR.
Brooks Walker

United States Patent Office 2,887,944
Patented May 26, 1959

2,887,944

BARBECUE ROTISSERIE

Brooks Walker, San Francisco, Calif.

Application May 3, 1955, Serial No. 505,731

10 Claims. (Cl. 99—421)

This invention pertains to improvements in rotisseries for cooking.

Barbecue stands involving a vertical rod supported by a U-shaped base that folds to a compact size when not in use is shown in my U.S. Patent No. 2,604,884, entitled "Barbecue Grill and Cooking Stand."

It is desirable with some foods to rotate the food being cooked, to vary the height of the food being cooked from the fire, and to be able to swing the rotating food to the most desirable position over the fire. All of these desired results are accomplished in this invention. In addition, provisions are made for driving two rotating spits from one motor and having the spits moving relative to each other and relative to the support.

Another feature is the overhung support for the spits wherein they are adequately supported for rotation from one end of the spit only. The spits and their support are so designed that the spits can be reversed end for end in their supports so that if the fire is hotter—as at the back of the fireplace—the spits can be reversed part way through the cooking period so that food on each end of the spit will cook approximately the same amount by mounting the support for the spits on a vertical rod. The spits can be moved vertically to any desired height above the fire and locked in any position by a twist of the movable portion of the handle. The advantage of the spits supported at one end only is that no support for the end of the spits away from the fire is needed and with a U-shaped base for the vertical rod, motor and spits the units can be pulled back from the fire whether in a fireplace, bonfire, or built-up grill stand for cooler working conditions, such as basting, removing a portion in a rarer condition, or reversing the spits end for end.

The advantage of swinging the spits at an angle to each other and driving from a motor is the economy of one motor, adjusting the two spits to fit different size foods and to adjust the cooking rods on the two spits to be over different portions of the fire for various rates of cooking. The vertical support on which the spit motor and spit supports is mounted can be of any type and cross section, and can be supported in any desired manner. If the support is round the motors can swing around the support.

Other objects of the invention will be more particularly pointed out in the accompanying specifications and claims.

I have illustrated my invention by way of example in the accompanying drawings, in which:

Fig. 1 is a perspective view of one form of the invention.

Fig. 2 is an enlarged view taken at section 2—2 of Fig. 1, showing a portion of the invention.

Fig. 3 is a section taken at section 3—3 of Fig. 2, showing a portion of the invention.

Fig. 4 is a section taken at section 4—4 of Fig. 2.

Fig. 5 is a section taken at section 5—5 of Fig. 2.

Fig. 6 is a section taken at section 6—6 of Fig. 3.

In Figs. 1–6 I have shown U-shaped base 10 for a barbecue having a vertical rod 14 pivoted at bolt 11 for folding and retained in a vertical position by removable pin 12 which is retained by chain 13, one end of which is attached to base 10.

Rotisserie motor 1 is preferably of the electric type powered by cord 2 from an electric outlet and controlled by switch 1a. This motor turns shaft 30 at some satisfactory speed such as 6 r.p.m. Shaft 30 drives shaft 23b which is rotatably supported in bearing 18a. Shaft 23b carries gear 23a and hollow shaft 23. A shaft 23b carries nut 31 and washer 32 at the motor side to retain it in bearing 18a. Wing bolt 24 secures either end of spit 6. Bearing 18a is suitable for supporting a load of meat or food on spit 6 while being rotated by motor 1 without a support for the spit 6 at the end away from hollow shaft 23. Bearing 18a is supported between the upper and lower ears of motor support 18, which ears are pivoted to bolt 16 at the top and bolt 16a at the bottom, as shown in Fig. 2. Bearing 17a is likewise supported between the ears at the top and bottom of bracket 17, which ears are pivoted by bolt 16 at their top and bolt 16a at their bottom. Bearing 17a supports shaft 22b which carries gear 21a, hollow shaft 21, and wing bolt 22 to support spit 5, so that it will be driven by motor 1 in counter rotation to spit 6. Shaft 22b has cap screw 24 and washer 25 to retain it in bearing 17a. The teeth of gears 21a and 21b are rounded and mesh on approximately the center line of pivot bolts 16 and 16a to keep gears 21a and 21b in mesh while allowing a considerable degree of swing of spit 5 relative to spit 6 to allow different size parcels of food to be cooked at different times and to allow adjustment of either spit relative to the other or over different parts of the fire.

Handle 15 is above the center of weight of motor 1, gears 21a and 23a, and their supports. Handle 15 is secured to extension 15a which rides on the outside of bar 14 which may be rectangular or round. Ears 15c and 15d support pivot bolts 16a and 16 respectively. Locking of the handle 15 in any desired elevation is accomplished by rotating portion 20a which is connected to rod 20 that is threaded to handle 15 so as to form a set screw to lock against vertical member 14. When rotating portion 20a is rotated the other way, handle 15 is free to be moved up and down to vary the height of the spits 5 and 6 above the fire.

Spits 5 and 6 have skewers 4 secured by thumb screw 3 to engage the meat or food being rotated for positive placement and rotation. As both ends of spits 5 and 6 are the same size, they can be reversed end for end to change the cooking rate of food at either end of the spits if the fire is different at each end, as when cooking in a fireplace.

By this invention spits can be supported for rotation from one end only. One motor can drive two spits which can swing at an angle to each other. The spits can be reversed end for end. The motor and spits can be moved up or down on a vertical support to an infinite number of elevations. One motor can drive the two spits. The handle and motor are away from the fire and remain cool and easy to handle.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A barbecue rotisserie, including a motor, a spit, the motor connected to said spit to rotate said spit, a support for said spit, said spit supported for rotation at one end only of said spit, either end of said spit fitting into said support to be driven thereby and be secured there for rotation by said motor, an offset prong, said prong slidably mounted on said spit, said spit being reversibly mounted in said support without removing said offset prong from said spit.

2. A barbecue rotisserie including a vertical rod, a spit, a support for said spit, a motor drivingly connected to the support said support for said spit adapted to support said spit from one end of said spit at a time and forming the only support for said spit, said motor movable vertically on said vertical rod, manual means for moving said motor up and down on said vertical rod and locking said motor at various heights on said rod, said manual means including a non-rotating handle extending away from said spit on the other side of said vertical rod, said manual locking means being operable from near the end of said handle at a point remote from said vertical rod.

3. A barbecue rotisserie including a vertical rod, a spit, a support for said spit, a motor drivingly connected to the support said support for said spit adapted to support said spit from one end of said spit at a time and forming the only support for said spit, said motor movable vertically on said vertical rod, manual means for moving said motor up and down on said vertical rod and locking said motor at various heights on said rod, said rod being rectangular, said motor being swingable relative to said rectangular vertical rod at any height adjustment, said manual means for moving including a non-rotating handle remote from said vertical rod, said locking means being controlled from near said handle at a point remote from said spit.

4. A barbecue rotisserie including a vertical rod, a spit, a support for said spit, a motor drivingly connected to the support said support for said spit adapted to support said spit from one end of said spit at a time and forming the only support for said spit, said motor movable vertically on said vertical rod, manual means for moving said motor up and down on said vertical rod and locking said motor at various heights on said rod, said support for said spit being swingable in a plane at right angles to said rectangular vertical rod, while said motor is locked to said vertical rod at a given elevation and without disturbing said locking means.

5. A barbecue motor, a barbecue spit, a mounting for said spit, driving means connecting the motor and the mounting said mounting supporting said spit at one end only while being rotated by said motor, a second spit, a second mounting for said second spit, driving means connecting the motor and the second mounting said second mounting supporting said second spit at one end only while being rotated by said motor, said second spit being swingable relative to said first spit in a plane common to both spits while said second spit is being rotated by said motor, through separate driven means.

6. A barbecue motor, a barbecue spit, a mounting for said spit, driving means connecting the motor and the mounting said mounting supporting said spit at one end only while being rotated by said motor, a second spit, a second mounting for said second spit, driving means connecting the motor and the second mounting said second mounting supporting said second spit at one end only while being rotated by said motor through driven means different than the driving means for said first spit, said second spit being swingable relative to said first spit in a plane common to both spits while being rotated by said motor, a drive from the mounting of said first spit to the mounting of said second spit, said drive remaining effective during a substantial swing of said spits relative to each other.

7. A barbecue motor, a barbecue spit, a mounting for said spit, driving means connecting the motor and the mounting said mounting supporting said spit at one end only while being rotated by said motor, a second spit, a second mounting for said second spit, driving means connecting the motor and the second mounting said second mounting supporting said second spit at one end only while being rotated by said motor through driven means separate from the driving means for said first spit, said second spit being swingable relative to said first spit in a plane common to both spits while being rotated by said motor, a drive from the mounting of said first spit to the mounting of said second spit, said drive remaining effective during a substantial swing of said spits relative to each other, said drive including a pair of gears, a pivot for one spit mounting relative to the other spit mounting, the hinge line of said pivot being close to the line of contact of said gears.

8. A pair of barbecue spits, a vertical support for said spits, interconnected driving means for both said spits, a motor for rotating both spits at one time, said motor driving one said spit through said driving means, a mounting for said spits, said mounting movable vertically at right angles to the plane of rotation of said spits, said spits being swingable relative to each other in the same plane while being rotated by said motor.

9. A food cooking device comprising a vertical support, a member vertically adjustable on the vertical support, a food support rotative on its own axis and carried by the member, means for rotating the food support, a handle on the member and extending in a direction opposite to the food support, an extension on the handle, the extension being rotatable relative to the handle, means carried by the extension for locking the member relative to the vertical support, the extension when rotated in one direction freeing the member for vertical adjustment relative to the vertical support and when rotated in the other direction locking the member against vertical adjustment relative to the vertical support.

10. A food cooking device as set forth in claim 9, wherein the extension on the handle is more remote from said vertical support than the center of the food support.

References Cited in the file of this patent

UNITED STATES PATENTS 2,486,345    Triulzi _____ Oct. 25, 1945